United States Patent Office 2,883,358
Patented Apr. 21, 1959

2,883,358

HARD RUBBER COMPOUND CONTAINING A MIXTURE OF PORTLAND CEMENT AND PETROLEUM COKE AS A FILLER

Donald P. Gentry and Charles R. Shepherd, Muncie, Ind., assignors to General Motors Corporation, Detroit, Mich., a corporation of Delaware No Drawing. Application October 15, 1956
Serial No. 615,744

5 Claims. (Cl. 260—41.5)

This invention relates to hard rubber compounds and is particularly concerned with moldable compounds having good physical properties.

Hard rubber compounds are used extensively in the manufacture of acid containers such as storage battery cases. These articles must be inexpensive to fabricate and must have a high degree of impact strength, good acid resisting qualities and the ability to maintain their shape without warpage over a wide range of temperautre conditions.

Battery cases have been made from hard rubber materials wherein the filler used is a carbonaceous compound generally included in the molding compound in substantial quantities. Many carbonaceous materials can be used for this purpose either alone or in combination with other non-reactive filling materials, for example, sand, etc. These fillers have been used in substantial quantities and have been mixed with reclaimed rubber, natural rubber, copolymer rubbers, etc., together with suitable softeners, accelerators and vulcanizing agents and have been molded to shape and cured to form battery cases having considerable utility.

One of the main objects of this invention is to provide a hard rubber compound for ultimate use in a battery case wherein the filler is a relatively inexpensive material which provides a battery case having satisfactory properties when compared to the usual battery cases molded from well known compounds. With this object in mind, it is possible, by utilizing a new filler, to reduce the overall cost of the case and still provide a moldable compound which produces an entirely satisfactory case having good physical properties.

More specifically, another object of the invention is to provide a filler for use in the formulation of hard rubber compounds which comprises essentially a mixture of petroleum coke ground to a powder of suitable size and mixed with specific proportions of Portland cement whereby the Portland cement coacts with the coke to produce a useful filler wherein the coke per se has a tendency to reduce the physical properties of the ultimate compound.

A still further object of the invention is to provide a new type hard rubber compound utilizing petroleum coke as a major portion of the filler wherein Portland cement is mixed therewith in quantities ranging from 5 to 15% by weight of the total filler to give reinforcement to the coke and to improve the physical properties of the hard rubber compound.

Further objects and advantages of the present invention will be apparent from the following description.

Hard rubber compounds normally use large amounts of reclaimed rubber frequently mixed with smaller proportions of natural rubber or rubbery copolymers of butadiene styrene, butadiene acrylonitrile, etc. The rubber component is mixed with fillers, in substantial proportion, that are completely inactive with respect to acids. The filler generally is present in quantities of from one-half to three-fourths of the total compound by weight. To this mixture is added sulfur as a vulcanizing agent together with some lime and suitable softening oils in small quantities to aid in the mixing of the compound. When the compound is thoroughly mixed and the filler is uniformly dispersed through the rubber, the material is molded and cured under pressure at the usual rubber curing temperature, for example, in the order of 370° F. for from 5 to 10 minutes whereupon a battery case is produced. It is understood that the curing times, the softeners and vulcanizing agents used, etc., may all be varied within rather broad well-known limits and that the main invention in the present instance is directed to the inclusion of a specific filler rather than the more general aspect of the compound per se.

Specifically, the filler we propose to use is a mixture of finely ground petroleum coke together with relatively small quantities of Portland cement. The Portland cement makes up between 5 and 15% by weight of the total filler used and comprises the staple product mixed with the petroleum coke and subsequently milled into the rubber compound. Preferably, from an 8% to 12% addition of Portland cement yields the best results. The Portland cement comprises crystals of jagged shape which appear to interlock and reinforce the hard rubber compound. In fact, the overall strength of the compound using Portland cement in addition to the petroleum coke filler improves substantially and makes the use of petroleum coke as a major portion of the filler a useful additive where heretofore, without the Portland cement, petroleum coke yielded too weak a battery case for production use.

It has been our experience that the Portland cement binds the filler together and interlocks it with the rubber ingredient for producing a compound which may be readily molded, which is inexpensive to produce and which provides good impact strength with the other necessary attributes of a battery case compound.

The formulation of the material may vary widely. Some typical recipes are as follows:

*Example #1*

| | Parts |
|---|---|
| Rubber | 60 |
| Filler | 300 |
| Sulfur | 20 |
| Lime | 10 |
| Softener | 40 |

*Example #2*

| | |
|---|---|
| Rubber | 90 |
| Filler | 270 |
| Sulfur | 30 |
| Lime | 15 |
| Softener | 35 |

*Example #3*

| | |
|---|---|
| Rubber | 100 |
| Filler | 260 |
| Sulfur | 15 |
| Lime | 20 |
| Softener | 25 |

*Example #4*

| | |
|---|---|
| Rubber | 50 |
| Filler | 280 |
| Sulfur | 20 |
| Lime | 10 |
| Softener | 30 |

*Example #5*

| | |
|---|---|
| Rubber | 100 |
| Filler | 400 |
| Sulfur | 45 |
| Lime | 25 |
| Softener | 45 |

Example #6

| | |
|---|---|
| Rubber | 100 |
| Filler | 200 |
| Sulfur | 45 |
| Lime | 25 |
| Softener | 30 |

In the foregoing representative recipes, the rubber ingredient may be reclaimed natural or synthetic rubber, natural rubber, synthetic rubbers such as rubbery butadiene styrene copolymers or rubbery butadiene acrylonitrile copolymers, campatible combinations of any of the above and other vulcanizable rubbery ingredients. In most instances, it is preferable to mix reclaimed rubber with natural or synthetic copolymers due to considerations of cost and, in this connection, it should be understood that sufficient reclaimed rubber, calculated as rubber hydrocarbon present, should be used to bring the rubber content to the desired weight figure. Of course, the compound may be made with 100% reclaimed rubber or 100% of the other rubbery ingredients mentioned, if desired.

The sulfur is used as a vulcanizing agent while the lime is used as an accelerator, other well known accelerators may be used. The softener aids in the general compounding technique wherein the softener permits easier mixing of the ingredients. Any of the usual softeners may be used such as petroleum oils and the like. Accelerators, vulcanizing agents, the usual fillers and plasticizers (softeners) are well known and many examples may be found in the Vanderbilt Rubber Handbook, published in 1948, by the R. T. Vanderbilt Company of New York.

Specifically, the quantity of Portland cement in the filler should range between 5 and 15% of the total weight of the filler used. In other words, if 300 parts of filler are used, as noted in recipe #1, this should be broken down into 255 to 285 parts of petroleum coke and 45 to 15 parts, respectively, of Portland cement. It has been found that quantities of less than 5% Portland cement do not improve the strength of the material sufficiently, while quantities in excess of 15% do not substantially improve the strength of the material to warrant the addition and, in fact, when the percentage is over 30%, the use of the cement is detrimental to the cure of the compound.

We have found that the mixture of Portland cement with petroleum coke yields a filler which is fully comparable to the most desirable carbonaceous types of fillers heretofore used and makes the use of petroleum coke entirely satisfactory. Heretofore, petrolum coke lacked the reinforcing effect in the compound, and battery cases, using such a filler in substitution for the more usual types of carbonaceous materials, were weak and unable to withstand the usual tests to which battery cases are subjected. This is probably explained by the physical structure of the coke particles which are of regular shape and do not tend to interlock together. By adding the Portland cement to the filler component, the strength of the case equalled and, in some cases, exceeded the strength of any of the known hard rubber battery cases.

Petroleum coke is relatively inexpensive as is Portland cement and, therefore, the specific filler does not add to the cost of the compounding while, in certain sections of the country, for example, on the Pacific coast, petroleum coke is plentiful and considerably cheaper than the more conventional types of carbonaceous fillers. Petroleum coke is a residue found in the petroleum refining industry and contains about .5% ash.

As is well known, Portland cement has as its basic ingredient, calcium oxide, aluminum oxide and silicon dioxide. The specific chemical function of the cement within the compound is not known but it has definitely been proved that the combination of the Portland cement with the petroleum coke yields a strong, highly reinforced compound which can be manufactured at less expense and is fully equal from the standpoint of quality with compounds using more expensive carbonaceous fillers.

While the embodiments of the present invention as herein disclosed constitute preferred forms, it is to be understood that other forms might be adopted.

What is claimed is as follows:

1. A hard rubber compound for use in the manufacture of molded battery cases, comprising in combination on a weight basis, a rubber ingredient selected from the class consisting of natural rubber, butadiene styrene, copolymer rubber, butadiene acrylonitrile copolymer rubber and compatible mixtures thereof ranging from 60 to 100 parts, a filler 200 to 400 parts together with suitable quantities of vulcanizing agents and softeners, said filler consisting of a mixture of Portland cement in quantities of from 5 to 15% together with ground petroleum coke making up the remainder of the filler.

2. A hard rubber compound for use in the manufacture of molded battery cases, comprising in combination on a weight basis, a rubber ingredient selected from the class consisting of natural rubber, butadiene styrene copolymer rubber, butadiene acrylonitrile copolymer rubber and compatible mixtures thereof 90 parts, a filler 280 parts, together with suitable quantities of vulcanizing agents and softeners, said filler consisting of a mixture of Portland cement in quantities of from 8 to 12% together with ground petroleum coke making up the remainder of the filler.

3. A hard rubber compound for use in the manufacture of molded battery cases, comprising in combination on a weight basis, a rubber ingredient selected from the class consisting of natural rubber, butadiene styrene copolymer rubber, butadiene acrylonitrile copolymer rubber and compatible mixtures thereof 90 parts, a filler 280 parts together with suitable quantities of vulcanizing agents and softeners, said filler consisting of a mixture of Portland cement in quantities of 10% together with ground petroleum coke making up the remainder of the filler.

4. A hard rubber compound for subsequent use in the molding of hard rubber battery cases comprising in combination on a weight basis, 60 to 100 parts of a rubber component selected from the class consisting of natural rubber, butadiene styrene copolymer rubber, butadiene acrylonitrile copolymer rubber and compatible mixtures thereof, vulcanizing and softening agents in suitable quantities and a filler making up the bulk of the compound and ranging in quantity from 260 to 300 parts, said filler consisting of a mixture of ground petroleum coke and Poortland cement, said Portland cement being present in the filler in quantities ranging from 5 to 15%.

5. A hard rubber compound for subsequent use in the molding of hard rubber battery cases comprising in combination by weight, 60 to 100 parts of a rubber component selected from the class consisting of natural rubber, butadiene styrene copolymer rubber, butadiene acrylonitrile copolymer rubber and compatible combinations thereof, vulcanizing and softening agents in suitable quantities and a filler making up the bulk of the compound and ranging in quantity from 260 to 300 parts, said filler consisting of a mixture of ground petroleum coke and Portland cement, said Portland cement being present in the filler in quantities ranging from 8 to 12%.

References Cited in the file of this patent

UNITED STATES PATENTS 1,940,528   Bond _____ Dec. 19, 1933

OTHER REFERENCES

McGregor: "Silicones and Their Uses," McGraw-Hill Book Co., Inc., 1954 (page 179 relied upon).